United States Patent [19]
Wolpers et al.

[11] Patent Number: 5,104,941
[45] Date of Patent: Apr. 14, 1992

[54] 3,4-POLYISOPRENE-CONTAINING RUBBER BLEND MIXTURES FOR TIRE TREADS

[75] Inventors: Jürgen Wolpers, Haltern; Hans B. Fuchs; Christoph Herrmann, both of Marl; Walter Hellermann, Dorsten; Karl-Heinz Nordsiek, Marl, all of Fed. Rep. of Germany

[73] Assignee: Huels Aktiengesellschaft, Marl, Fed. Rep. of Germany

[21] Appl. No.: 672,319

[22] Filed: Mar. 20, 1991

[30] Foreign Application Priority Data

May 18, 1990 [DE] Fed. Rep. of Germany ....... 4016079

[51] Int. Cl.$^5$ ............ C08L 9/00; C08L 9/06; B60C 9/02
[52] U.S. Cl. .................... 525/237; 525/236; 525/192; 524/526; 152/209 R
[58] Field of Search ............. 525/237; 152/209 R

[56] References Cited

U.S. PATENT DOCUMENTS 4,385,151 5/1983 Furukawa et al. .
4,521,587 6/1985 Furukawa et al. .
4,843,120 6/1989 Halasa et al. ................ 525/237

OTHER PUBLICATIONS

Abstract of Japanese Patent 60-94433, Misawa et al., 5/85.
Abstract of Japanese Patent 60-94435, Mizoguchi et al., 5/85.

Primary Examiner—Carman J. Seccuro
Attorney, Agent, or Firm—Oblon, Spivak, McClelland, Maier & Neustadt

[57] ABSTRACT

Rubber mixtures for tire treads are found, which show an improved wet skid resistance coupled with balanced abrasion and rolling resistance properties. This is achieved by rubber blend mixtures which contain 3,4-polyisoprene having a 3,4-content from 55 to 75%, a glass transition temperature from 0° to −25° C., a number average molecular weight of 200,000 and higher and an inhomogeneity U of less than 1.8. Motor vehicle tires can be prepared in an advantageous manner with these rubber mixtures.

18 Claims, 2 Drawing Sheets

3,4-POLYISOPRENE-CONTAINING RUBBER BLEND MIXTURES FOR TIRE TREADS

BACKGROUND OF THE INVENTION

1. Field of the Invention

The present invention is directed to rubber blends, and in particular a rubber blend containing a 3,4-polyisoprene rubber.

2. Discussion of the Background

As a result of the advances in road vehicle construction, the demands to be met by the running properties of the tires are becoming increasingly more stringent. The primary concern is the greatest possible safety in road traffic, which is closely related to the property of the skid resistance, in particular the wet skid resistance of the tire treads. Likewise, however, the highest possible abrasion resistance is demanded, in order to provide the tire with an appropriate service life. Moreover, from both economic and environmental aspects, the rolling resistance of the tires and hence the fuel consumption of the vehicle should be minimized.

As is known, these demands on modern vehicle tires are contradictory, i.e. an increase in the skid resistance entails a deterioration in the abrasion or rolling resistance. Most of the prior proposed measures for improving the skid resistance have the disadvantage that they are at the expense of the equally important abrasion and rolling resistance properties. There is, therefore, a demand for rubber mixtures having improved properties.

Thus, for example, an increase in the skid resistance by the use of rubber polymers having an increased glass transition temperature (Tg) such as, for example, styrene/butadiene rubbers of increased styrene content, is known. These can be used either as the sole rubber base or as a blend with conventional diene rubbers. A certain improvement with respect to the rolling resistance is obtained by the use of high-Tg rubber polymers of low styrene content and increased vinyl content, which are accessible by modern solution polymerization using lithium catalysts. The disparity between the contradictory properties of skid resistance and abrasion resistance can, however, not be overcome in this way.

SUMMARY OF THE INVENTION

It has now been found, surprisingly, that an optimum improvement of the skid resistance coupled with balanced and acceptable abrasion resistance and rolling resistance properties is achieved by the 3,4-polyisoprene-containing rubber blend mixture according to the present invention.

The polyisoprene rubber must satisfy clearly defined conditions which are not obvious to those skilled in the art, with respect to 1. the 3,4-content,
2. the glass transition temperature,
3. the molecular weight,
4. the molecular weight distribution and
5. the long-chain branching.

The rubber mixture of the present invention contains from 5 to 35 parts by weight of a 3,4-polyisoprene and from 95 to 65 parts by weight of a conventional rubber, in addition to conventional fillers, oils, auxiliaries and vulcanizing agents. The 3,4-polyisoprene has a 3,4 content of 55–75% as determined by NMR spectroscopy, a glass transition temperature of from 0° to −25° C. as determined by differential scanning calorimetry at a heating rate of 10 K/minute, a number average molecular weight, determined by gel permeation chromatography, of 220,000 or higher, and an inhomogeneity of less than 1.8. The rubber mixture of the present may also contain a 3,4-polyisoprene having a number average molecular weight of from 200,000 to 218,000 and an inhomogeneity of 1.4 or less.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
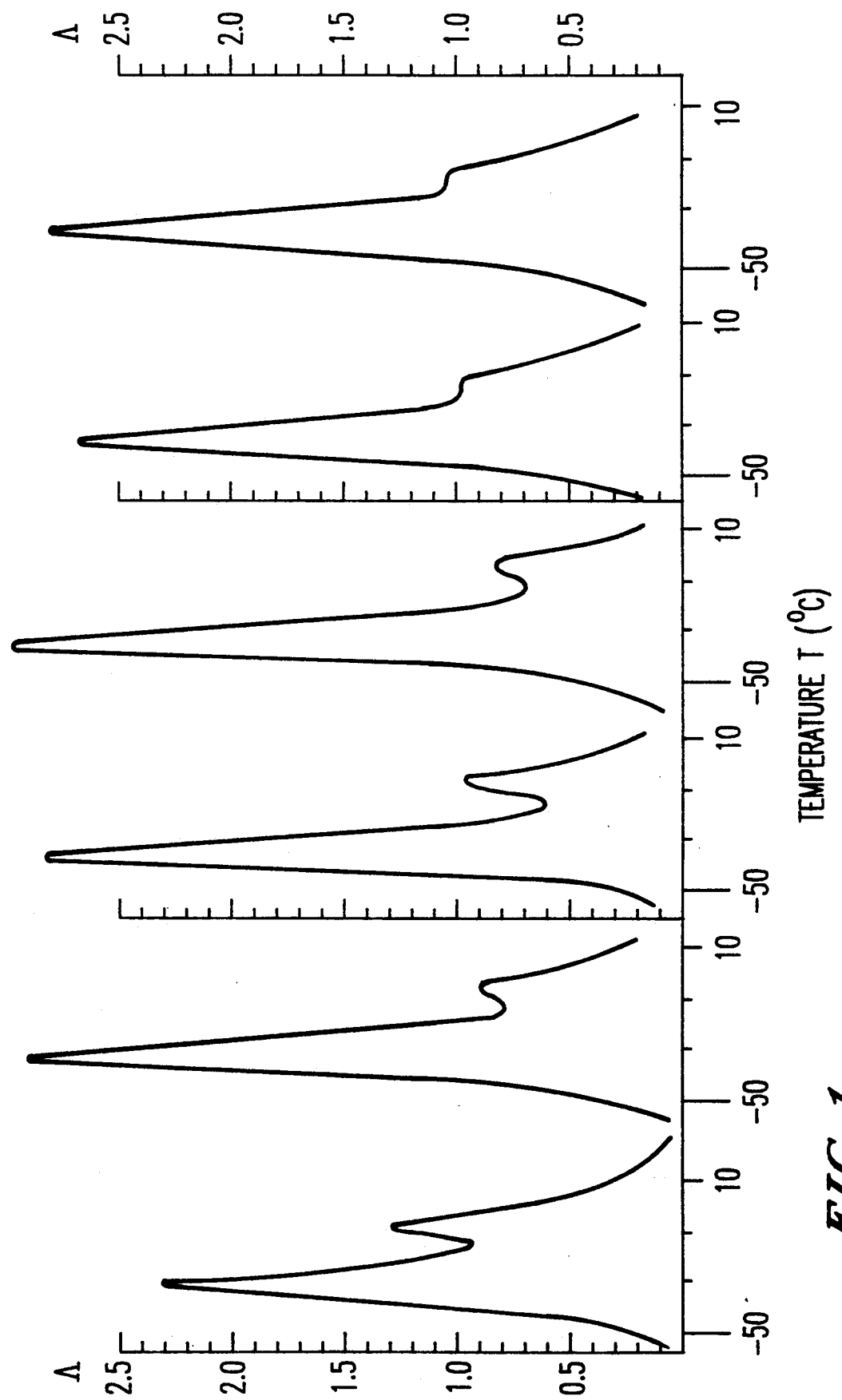
FIGS. 1 and 2 are plots of the temperature dependence of the damping signal of rubber blends as they are obtained from the DIN torsional pendulum test.

The polyisoprene of the presnet invention is prepared by conventional anionic polymerization processes, for example processes using organolithium catalysts. One skilled in the art is familiar with these polymerization processes and modifications of the polymerization process to obtain polyisoprene having the desired molecular weight and inhomogeneity parameters. The 3,4-content of the polyisoprene used in the blends of the invention is about 55 to about 75% and preferably about 60%, determined by NMR spectroscopy. Another measure of the 3,4-content is the glass transition temperature Tg. A 3,4-content of the polyisoprene of about 60% corresponds to a glass transition temperature of about −8° C. The preferred range of the glass transition temperature should not exceed a value of −5° C., measured by the differential scanning calorimetry (DSC) method at a temperature rise of 10° Kelvin/minute, or fall below the value The constraint of the Tg range is necessary for the of −16° C. following reasons:

3,4-Polyisoprene is a blend component that can make a considerable contribution to the skid resistance only if its glass transition temperature is as high as possible. Tests prove that the skid resistance is still measurably improved at Tg values from 0° to −25° C. However, in order to obtain good skid resistance at the claimed quantitative 3,4-polyisoprene contents, the Tg should be in the range from −5° to −16° C.

At glass transition temperatures above 0° C. according to DSC, the co-vulcanization of 3,4-polyisoprene with conventional rubbers decreases noticeably, so that a uniformly vulcanized elastomer can no longer be produced. For this reason, the glass transition temperature should not be above 0° C.

Surprisingly, molecular structure parameters also have an influence on the skid resistance-improving effect of 3,4-polyisoprene as a blend component. Thus, the molecular weight must not be too low. The numerical mean of the molecular weight should not be below 220,000.

Moreover, the inhomogeneity U, defined by U $= \overline{M}w/\overline{M}n - 1$, should be at most 1.8 ($\overline{M}w$ = average molecular weight, $\overline{M}n$ = number average of the molecular weight). If the molecular weight distribution is too broad, corresponding to a high inhomogeneity U, the wet skid resistance is also impaired. If U is less than 1,4 the wet skid resistance is improved, so that Mn could be less than 218 000 but more than 200 000.

Rubbers with long-chain branching have advantages over their homologues with a linear structure (cf. European Published Application 0,090,365) for use in the present blends. These rubbers are obtained by converting the diene monomers to so-called living polymers, and then reacting the latter with coupling agents such as, for example, polyhalogen compounds or divinyl aromatics.

The blending ratio between 3,4-polyisoprene and conventional rubbers should be at most 35:65 parts by weight. Preferably, and particularly also with a view to retaining a good rolling resistance and abrasion level in specific applications, a proportion of 5 to 20 parts of 3,4-polyisoprene to 95 to 80 parts of the main rubber component is the optimum. Too high a proportion of 3,4-polyisoprene in the blend has the result that the tread mixture hardens unduly at low temperatures, i.e., below 0° C., and can become fragile in winter running.

Although 3,4-polyisoprene/rubber blends for tire treads and for damping elements have already been used in European Patent Specifications 0,053,763 and 0,054,204, these mixtures still have disadvantages.

(a) The highest possible 3,4 content is needed for an effective increase in damping and hence in the skid resistance of the tire tread. However, this has the result that, due to the high glass transition temperature, 3,4-polyisoprene can no longer be used as the sole rubber base.

(b) All polyisoprenes having a 3,4-content of more than 15% are regarded as equally suitable in European Patent Specification 0,053,763. Preferably, a 3,4-content of 25 to 50% is claimed. The preferred range of the polyisoprene used according to the invention is, however, about 60%, whereby optimum tire properties are obtained.

The influence of the molecular weight and the molecular weight distribution of the polyisoprene to be used, on the tire properties, is also not obvious from these references, since this relationship is not recognized.

Other features of the invention will become apparent in the course of following descriptions of exemplary embodiments which are given for illustration of the invention and are not intended to be limiting thereof.

EXAMPLES

Preparation of the polyisoprene according to the invention

The solvent used was a hydrocarbon mixture which contained about 50% of hexane. Further constituents of this hydrogenated $C_6$-cut were especially pentane, heptane and octane as well as their isomers.

The solvent was dried over a molecular sieve of 0.4 nm pore size, so that the water content was lowered to less than 10 ppm, and then stripped with $N_2$.

The organolithium catalyst was n-butyllithium, which was used in the form of a 20% by weight solution in hexane.

Before use, the isoprene was boiled under reflux for 24 hours over calcium hydride, distilled off and titrated with n-butyllithium to the end point in the presence of o-phenanthroline. Glycol ether microstructure regulators of the formula $R_1-O-CH_2-CH_2-O-R_2$ with alkyl groups $R_1$ and $R_2$ having different numbers of carbon atoms and a total number of carbon atoms between 5 and 7 were used as the co-catalyst.

The glycol ethers were distilled over calcium hydride and then titrated with n-butyllithium to the end point in the presence of o-phenanthroline. Divinylbenzene was used in the form of an isomer mixture of 64% of m-divinylbenzene and 36% of p-divinylbenzene, after drying over alumina.

1.5 kg of the $C_6$-hydrocarbon mixture, 200 g of isoprene and the particular co-catalyst were first introduced at 50° C. into a V2A stainless steel stirred autoclave flushed with dry nitrogen. The quantity of the co-catalyst is determined from the particular catalyst-/co-catalyst weight ratios indicated. The polymerization was started by addition of 2.5 mmol of n-butyllithium solution and kept isothermal. After 2 hours, divinylbenzene was added.

The polymer obtained was stabilized with 0.5 parts of 2,2'-methylene-bis-(4-methyl-6-tert.-butylphenol), relative to 100 parts of isoprene, precipitated with 2,500 ml of an isopropanol/methanol mixture in an 80:20 volume ratio and dried at 50° C.

The coupling yield is regarded as the percentage fraction of rubber which has a star-type structure after the reaction with a coupling agent and is distinguished by a considerably higher molecular weight than that of the uncoupled rubber. The determination is carried out by GPC analysis, tetrahydrofuran being used as the solvent and polystyrene being used as the column material. The polymers are characterized by means of a light-scattering detector. For this purpose, samples are taken from the reactor before the addition of the coupling agent and at the end of the reaction. The microstructure is determined by means of the NMR spectrum.

In addition to the rubber constituents, the tire tread usually contains of 50 to 90 parts of a suitable furnace black (carbon black) and of 5 to 45 parts of an oil, both relative to 100 parts by weight of rubber. The mixture also contains the usual additives, such as zinc oxide, stearic acid, and antioxidants, as well as sulphur and accelerators.

When preparing the mixture, the important point for the most effective improvement of the skid properties is that the component which improves the skid resistance, namely the 3,4-polyisoprene according to the invention, forms a separate domain, in order to become active as an anti-skid component. For this purpose, incompatibility of the 3,4-polyisoprene with the other polymers is necessary. Such an incompatibility manifests itself in the torsional pendulum diagram (according to DIN 53 445) by the formation of a separate damping signal, which is as pronounced as possible, of the 3,4-polyisoprene domain in addition to the rubber main component domain. With increasing compatibility, the damping signals shift towards one another and ultimately fuse, even though the signals of the individual components by themselves appear in different locations because of differing glass transition temperatures.

It has been discovered that the necessary incompatibility of the 3,4-polyisoprene is a function of the molecular weight distribution and also of the molecular weight of the polymer. In the usual molecular weight range, incompatibility increases, the narrower the resulting molecular weight distribution. The molecular weight distribution is in general measured by the inhomogeneity (U) of a polymer. The inhomogeneity is defined as the ratio of the average molecular weight ($\overline{Mw}$) to the number average molecular weight ($\overline{Mn}$) minus 1, i.e. $U = \overline{Mw}/\overline{Mn} - 1$.

Torsiograms of blends of 3,4-polyisoprenes, for example with a vinyl-SBR rubber with 15% of copolymerized styrene and a vinyl content of 45% or with one of the most frequently used emulsion SBR types, namely SBR 1712, worth 23.5% of copolymerized styrene and 37.5 parts by weight of oil, relative to 100 parts by weight of rubber, show the desired incompatibility at an inhomogeneity U of from 0.8 to about 1.8 and hence the improvement according to the invention in the skid resistance. At U values of 1.9 and higher, there is only a weakly indicated shoulder in the damping diagram, which leads to inadequate skid resistance.

EXAMPLES 1 AND 2 AND COMPARISON EXAMPLES 3 TO 5

The examples listed in Table 1 demonstrate the positive effect of 3,4-polyisoprene on truck tread mixtures, which are prepared from natural rubber and cis-polybutadiene rubber. It is particularly important that the abrasion resistance and rolling resistance are not substantially impaired. The 3,4-polyisoprene used had a 3,4-content of 60%, determined by NMR spectroscopy, a Mooney viscosity of 65, a U value of 1.4 and a number average molecular weight $\overline{M}n$ of 250,000. The mixtures are indicated in Table 1. The test results are also summarized in Table 1.

From Examples 1 and 2 according to the invention, it can be seen that 10 to 15 parts of 3,4-polyisoprene increase the skid resistance by 7% over Comparison Example 3, while the rolling resistance rises only insignificantly (by 2 to 4%). The dynamic heating, measured by the Martens ball attrition method, also does not rise significantly in the 200 N stage. Although it can be seen from Comparison Examples 4 and 5 that the skid resistance rises further to 112 and 117% by using 25 to 35% of 3,4-polyisoprene respectively, this advantage involves a considerably higher DIN abrasion and a substantially stronger heating in the ball attrition test. These disadvantages for Comparison Examples 4 and 5 are not tolerable for truck tires, so that the proportion of 3,4-polyisoprene must be limited to less than 25% for this application.

EXAMPLES 6 AND 7 AND COMPARISON EXAMPLES 8 AND 9

In Examples 6 and 8, 20 parts of the 3,4-polyisoprene described in Example 1 were added to a passenger car tire tread based on a vinyl SBR rubber, with 40% vinyl content and 20% of copolymerized styrene. The properties at filler levels of 60 parts of carbon black and 8 parts of oil (Example 6) and, respectively, 80 parts of carbon black and 20 parts of oil (Example 7) were compared in each case with the same formulation but without 3,4-polyisoprene (Comparison Examples 8 and 9).

TABLE 1

|  | Examples* | | Comparison Examples* | | |
|---|---|---|---|---|---|
|  | 1 | 2 | 3 | 4 | 5 |
| Natural rubber | 75 | 70 | 85 | 60 | 50 |
| cis-Polybutadiene | 15 | 15 | 15 | 15 | 15 |
| 3,4-Polyisoprene** | 10 | 15 | — | 25 | 35 |
| Wet skid resistance (50 km/h) | 107 | 107 | 100 | 112 | 117 |
| Rolling resistance (50 km/h) | 98 | 96 | 100 | 92 | 90 |
| Martens ball fatigue (200 N, °C.) | 137 | 139 | 136 | 149 | 159 |

TABLE 1-continued

|  | Examples* | | Comparison Examples* | | |
|---|---|---|---|---|---|
|  | 1 | 2 | 3 | 4 | 5 |
| DIN abrasion (mm³) | 105 | 109 | 97 | 130 | 124 |

*further mixture constituents (parts by weight):
50 N 220 carbon black
4 aromatic oil
3 zinc oxide
2 stearic acid
2 antioxidants
2 Koresin ® resin
1.2 MBS accelerator
2 sulphur (Vulcanization for 20 minutes at 150° C.)
**Glass transition temperature −8° C., ML₄ 65, molecular weight $\overline{M}n$ = 250,000, inhomogeneity = 1.4.
MBS accelerator = N-morpholino-2-benzothiazolyl sulfenamide
(see note p. 14)

TABLE 2

Composition of the mixture and results of the laboratory and tire tests.

|  | Examples | | Comparison Examples | |
|---|---|---|---|---|
|  | 6 | 7 | 8 | 9 |
| OE-SBR (1) | 41.25 | 41.25 | 41.25 | 41.25 |
| SBR oil-free (2) | 50 | 50 | 70 | 70 |
| 3,4-Polyisoprene (3) | 20 | 20 | — | — |
| N 234 carbon black | 60 | 80 | 60 | 60 |
| Aromatic oil* | 8 | 20 | 8 | 20 |
| Wet skid resistance at 50 km/h index (SBR 1712 = 100) | 114 | 113 | 108 | 106 |
| Rolling resistance at 80 km/h (index) | 96 | 89 | 98 | 87 |
| Frank flexometer (°C.) | 120 | 108 | 123 | 114 |
| DIN abrasion (mm³) | 165 | 133 | 146 | 117 |

Characterization of the rubbers:
(1) OE-SBR: Vinyl SBR with 40% of 1,2-content and 20% of bound styrene, relative to total polymer, 37.5 parts by weight of aromatic oil per 100 parts of polymer, ML (1 + 4) 100° C.:50
(2) SBR oil-free: Vinyl SBR with 40% of 1,2-content and 20% of bound styrene, relative to total polymer, ML (1 + 4) 100° C.:50
(3) 3,4-polyisoprene: 60% of 3,4-content according to NMR, Tg −8° C., number average molecular weight $\overline{M}n$ = 250,000, U = 1.4
*Further mixture constituents (parts by weight): 3 of zinc oxide, 2 of stearic acid, 2 of antioxidants, 1 of Koresin ® resin, accelerators: 1.4 of CBS, 0.3 of DPG, 1.6 of sulphur
CBS = N-cyclohexyl-2-benzothiazolyl sulfenamide
DPG = N,N'-diphenylguanidine
MBS, CBS and DPG are internationally accepted abbreviations for common accelerators.

In the case of wet skid resistance and rolling resistance, the index numbers relate to a standard tread based on SBR 1712 having a value of 100, values above 100 being better and those below 100 being poorer. The Frank flexometer gives the temperature reached after 15 minutes of stress, the lower temperature indicating the more favorable dynamic heating and hence the lower rolling resistance of the tire. The DIN wear is measured in mm³, the lowest value representing the most favorable wear resistance.

A comparison of Example 6 with 20 parts of 3,4-polyisoprene versus Comparison Example 8 without 3,4-polyisoprene rubber, shows that the wet skid resistance increases from 108 to 114 at a filler level of 60 phr of carbon black. Both the rolling resistance at 80 km/h and the dynamic heating in the Frank flexometer test hardly change. Only the DIN abrasion is slightly increased.

If an increase in wear is to be avoided, it is possible to increase the filler level as described in Example 7 and Comparison Example 9, in which case naturally the rolling resistance rises slightly. At 80 phr of carbon black of type N 234, the abrasion is only 133 mm³ (117 mm³ without 3,4-polyisoprene rubber). The significant advantage of wet skid resistance is fully preserved. While Comparison Example 9, because of the higher filler level, reaches an index value of 106, relative to a standard tread based on SBR 1712 with 70 phr (parts per 100 parts rubber) of N 339 carbon black, a decisive improvement of the wet skid resistance to 113 is achieved by the replacement of 20 parts of vinyl SBR by 3,4-polyisoprene rubber. On the other hand, the rolling resistance hardly changes from that of the Comparison Example (index value 89 to 87).

EXAMPLES 10 TO 13 AND COMPARISON EXAMPLES 14 AND 15

TABLE 3

|  | Examples | | | | Comparison Examples | |
| --- | --- | --- | --- | --- | --- | --- |
|  | 10 | 11 | 12 | 13 | 14 | 15 |
| Mooney viscosity ML (1 + 4) 100° C. | 77 | 55 | 52 | 68 | 72 | 49 |
| Molecular weight in thousands | | | | | | |
| $\overline{M}w$ | 629 | 411 | 513 | 610 | 651 | 628 |
| $\overline{M}n$ | 286 | 228 | 223 | 218 | 223 | 214 |
| $U^* = \overline{M}w/\overline{M}n - 1$ | 1.20 | 0.81 | 1.30 | 1.79 | 1.92 | 1.94 |
| Suitability** | + | + | + | (+) | − | − |

Figure 2:
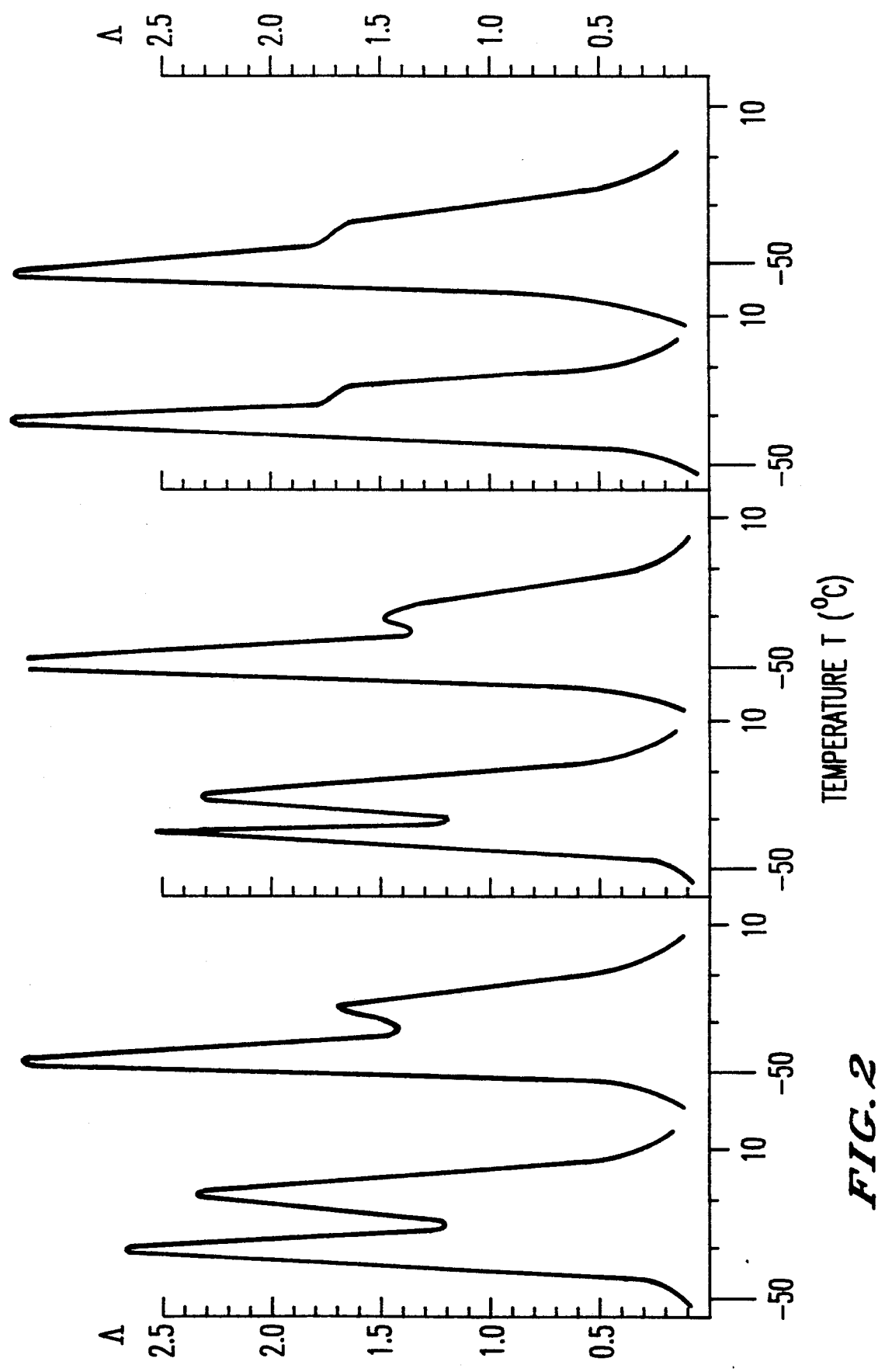

Molecular weights $\overline{M}w$ and $\overline{M}n$ from gel permeation chromatography.
*U = inhomogeneity
**determined from the torsional pendulum diagram according to DIN 53 445, method A (cf. FIGS. 1 and 2)

These examples illustrate the requirements of the 3,4-polyisoprene anti-skid component with respect to molecular weight and inhomogeneity.

Blends of 200 g each of various polyisoprenes with 600 g each of two different styrene/butadiene copolymer rubbers were prepared on a laboratory milling unit and vulcanized for 30 minutes at 150° C. with a vulcanization system consisting of one part of CBS accelerator and two parts of sulphur. This vulcanizate was then subjected to the torsional pendulum test according to DIN 53 445, method A. The styrene/butadiene rubbers were an oil-free solution SBR of 45% vinyl content and 15% of copolymerized styrene and an oil-extended emulsion SBR with 23.5% of styrene and 37.5 parts by weight of oil, relative to 100 parts of rubber, known as type SBR 1712. The torsiograms of the blends with the 45% vinyl SBR and 15% of copolymerized styrene and the 3,4-polyisoprene polymers are shown in FIG. 1, and the polyisoprenes with the emulsion SBR type 1712 in FIG. 2. The characterizing molecular parameters of the polyisoprenes are reproduced in Table 3. The diagrams in FIGS. 1 and 2 show the suitability of the 3,4-polyisoprenes as anti-skid component, depending on the intensity or on the absence of a pronounced separate damping signal of the 3,4-polyisoprene.

The curves in FIGS. 1 and 2 are plots of the temperature dependence of the damping signal of the particular blends, as they are obtained from the DIN torsion pendulum test. The logarithmic decrement of the damping (lambda), which is directly related to the loss factor tan δ, is plotted versus the temperature. The test conditions were a temperature rise of 1°/minute and free oscillation of the test specimen, which is in the region of about 1 Hz, but can vary slightly depending on the state of the sample.

Clearly separated signals of the polyisoprene component are visible for the polymers of Examples 10, 11 and 12 both with the vinyl SBR and with the emulsion SBR type 1712. According to Table 3, these are polymers having inhomogeneities from 0.8 to 1.3, which can be regarded as relatively low in polymerization technology, and number average molecular weights of 223,000 to 286,000. In blends with both SBR types, all three polymers give readily visible polyisoprene damping signals, so that these polymers are suitable as anti-skid components in a blend with SBR. The polyisoprene signal becomes markedly weaker in Example 13, in a blend both with the vinyl SBR (FIG. 1) and with SBR 1712 (FIG. 2). The isoprene polymer in Example 13 has a number average molecular weight of 218,000 and a high inhomogeneity of 1.79. A limiting case is reached here, where the signal of the polyisoprene still appears only very weakly, particularly with the E SBR type 1712. The boundary between suitable and unsuitable isoprene polymers cannot be drawn very sharply, because several factors are involved, as found by us and described here, namely the number average molecular weight $\overline{M}n$ and the inhomogeneity U, i.e., the molecular weight distribution. With the narrow molecular weight distribution (U = 1.4 or even lower), the number average molecular weight can also be below 218,000. However, the $\overline{M}n$ value should not be less than 200,000 for good skid resistance, even in the case of a narrow molecular weight distribution (U = less than 1.4). If the inhomogeneity is at higher values of up to 1.8, polyisoprene still fulfills the purpose according to the invention if its number average molecular mass ($\overline{M}n$) has a minimum value of 220,000 according to GPC.

On the other hand, at high inhomogeneity values of 1.9 and higher, there is no longer an adequate formation of the isoprene signal in the torsiogram even at a number average molecular weight of more than 220,000, and correspondingly a good skid resistance effect is no longer to be expected. Unsuitable isoprene polymers, in spite of having a suitable glass transition temperature, are described in Comparison Examples 14 and 15 In Comparison Example 14, a 3,4-polyisoprene having a number average molecular weight $\overline{M}n$ of 223,000 and an inhomogeneity of 1.92 was investigated as a blend with vinyl SBR (FIG. 1) and emulsion SBR type 1712 (FIG. 2) in the torsion pendulum test. It can be seen in both cases that the damping signal of 3,4-polyisoprene is indicated only as a shoulder. Such a polymer is no longer suitable as an anti-skid component.

In Comparison Example 15, an isoprene polymer having a comparable inhomogeneity (U = 1.94) but an even lower molecular weight $\overline{M}n$ = 214,000) was used. This polymer had a Mooney viscosity of only 49. These even more unfavorable values led, in a blend with both SBR types, to an even weaker polyisoprene signal (FIGS. 1 and 2), which is now indicated only as a weak shoulder. This result shows that the polymer from Comparison Example 15 is likewise unsuitable for the purpose according to the invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A rubber mixture for a tire tread having improved wet skid resistance, comprising from 5 to 35 parts by weight of a 3,4-polyisoprene and from 95 to 65 parts by weight of a sulfur-vulcanizable elastomer, wherein said 3,4-polyisoprene is at least partially incompatible with said sulfur-vulcanizable elastomer and has
  a) a 3,4-content from 55 to 75%, determined by NMR spectroscopy,
  b) a glass transition temperature from 0° to −25° C., determined by differential scanning calorimetry at a heating rate of 10° K/minute,
  c) a number average molecular weight $\overline{M}n$, determined by gel permeation chromatography of 220,000 or higher, and
  d) an inhomogeneity U of less than 1.8, the inhomogeneity being defined by the equation $U = \overline{M}w/\overline{M}n - 1$, where $\overline{M}w$ and $\overline{M}n$ are determined by gel permeation chromatography.

2. The rubber mixture of claim 1, comprising 10–20 parts by weight of said 3,4-polyisoprene and 90–80 parts by weight of said sulfur-vulcanizable elastomer.

3. The rubber mixture of claim 1, wherein said sulfur-vulcanizable elastomer is a styrene/butadiene rubber, a polybutadiene rubber, a natural rubber or mixture thereof.

4. The rubber mixture of claim 3, wherein said styrene/butadiene rubber is prepared by solution polymerization or emulsion polymerization.

5. The rubber mixture of claim 1, wherein said 3,4-polyisoprene has a glass transition temperature from −5° to −16° C.

6. A rubber mixture for a tire tread having improved wet skid resistance, comprising from 5 to 35 parts by weight of a 3,4-polyisoprene and from 95 to 65 parts by weight of a sulfur-vulcanizable elastomer, wherein said 3,4-polyisoprene is at least partially incompatible with said sulfur-vulcanizable elastomer and has
  a) a 3,4-content from 55 to 75%, determined by NMR spectroscopy,
  b) a glass transition temperature from 0° to −25° C., determined by differential scanning colorimetry at a heating rate of 10° K/minute,
  c) a number average molecular weight $\overline{M}n$, determined by gel permeation chromatography from 200,000 to 218,000, and
  d) an inhomogeneity (U) of 1.4 or less.

7. The rubber mixture of claim 6, comprising 10–20 parts by weight of said 3,4-polyisoprene and 90–80 parts by weight of said sulfur-vulcanizable elastomer.

8. The rubber mixture of claim 6, wherein said sulfur-vulcanizable elastomer is a styrene/butadiene rubber, a polybutadiene rubber, a natural rubber or mixture thereof.

9. The rubber mixture of claim 8, wherein said styrene/butadiene rubber is prepared by solution polymerization or emulsion polymerization.

10. The rubber mixture of claim 6, wherein said 3,4-polyisoprene has a glass transition temperature from −5° to −16° C.

11. A method of improving the wet skid resistance of a rubber mixture for a tire tread, comprising
  adding from 5 to 35 parts by weight of a 3,4-polyisoprene to from 95 to 65 parts by weight of a sulfur-vulcanizable elastomer containing conventional fillers, oils, auxiliaries and vulcanizing agents, wherein said 3,4-polyisoprene is at least partially incompatible with said sulfur-vulcanizable elastomer and has
  a) a 3,4-content from 55 to 75%, as determined by NMR spectroscopy,
  b) a glass transition temperature from 0° to −25° C., determined by differential scanning calorimetry at a heating rate of 10° K/minute,
  c) a number average molecular weight $\overline{M}n$, determined by gel permeation chromatography of 220,000 or higher, and
  d) an inhomogeneity U of less than 1.8, the inhomogeneity being defined by the equation $U = \overline{M}w/\overline{M}n - 1$, where $\overline{M}w$ and $\overline{M}n$ are determined by gel permeation chromatography.

12. The method of claim 11, comprising adding 10–20 parts by weight of said 3,4-polyisoprene to 90–80 parts of said sulfur-vulcanizable elastomer.

13. The method of claim 11, wherein said 3,4-polyisoprene has a glass transition temperature of −5° to −16° C.

14. The method of claim 11, wherein said sulfur-vulcanizable elastomer is a styrene/butadiene rubber, a polybutadiene rubber, a natural rubber or mixture thereof.

15. A method for improving the wet skid resistance of a rubber mixture, comprising
  adding from 5 to 35 parts by weight of a 3,4-polyisoprene to from 95 to 65 parts by weight of a sulfur-vulcanizable elastomer, further containing conventional fillers, oils, auxiliaries or vulcanizing agents, wherein said 3,4-polyisoprene is at least partially incompatible with said sulfur-vulcanizable elastomer and has
  a) a 3,4-content of from 55 to 75%, determined by NMR spectroscopy,
  b) a glass transition temperature from 0° to −25° C., determined by differential scanning colorimetry at a heating rate of 10° K/minute,
  c) a number average molecular weight, determined by gel permeation chromatography, of from 200,000 to 218,000, and
  d) an inhomogeneity U of 1.4 or less.

16. The method of claim 15, comprising adding 10–20 parts by weight of said 3,4-polyisoprene to 90–80 parts of said sulfur-vulcanizable elastomer.

17. The method of claim 15, wherein said 3,4-polyisoprene has a glass transition temperature of −5° to −16° C.

18. The method of claim 15, wherein said sulfur-vulcanizable elastomer is a styrene/butadiene rubber, a polybutadiene rubber, a natural rubber or mixture thereof.

* * * * *